(12) United States Patent
Kabir et al.

(10) Patent No.: US 7,073,775 B2
(45) Date of Patent: Jul. 11, 2006

(54) ROTATING CHECK VALVE FOR COMPRESSION EQUIPMENT

(75) Inventors: Omar M. Kabir, Waller, TX (US); John C. Bartos, Tomball, TX (US)

(73) Assignee: Cameron International Corporation, Houston, TX (US)

( * ) Notice: Subject to any disclaimer, the term of this patent is extended or adjusted under 35 U.S.C. 154(b) by 73 days.

(21) Appl. No.: 10/939,742

(22) Filed: Sep. 13, 2004

(65) Prior Publication Data

US 2006/0054850 A1 Mar. 16, 2006

(51) Int. Cl.
*F16K 31/02* (2006.01)
(52) U.S. Cl. ............. 251/314; 251/129.11; 251/129.12
(58) Field of Classification Search ............ 251/314
See application file for complete search history.

(56) References Cited

U.S. PATENT DOCUMENTS

| | | | |
|---|---|---|---|
| 1,041,165 A | 10/1912 | Riley | |
| 1,634,141 A | 6/1927 | Hamilton | |
| 1,681,169 A | 8/1928 | Brandt | |
| 1,801,383 A | 4/1931 | Winsor | |
| 1,859,916 A | 5/1932 | Eickmeyer | |
| 1,902,577 A | 3/1933 | Oakley | |
| 1,977,892 A | 10/1934 | Ostlind | |
| 2,295,109 A * | 9/1942 | Hamilton | 137/584 |
| 2,949,127 A | 8/1960 | Malina | |
| 3,990,423 A * | 11/1976 | Cross et al. | 123/190.17 |
| 4,311,020 A | 1/1982 | Tobin et al. | |
| 4,395,019 A | 7/1983 | Searles | |
| 4,460,009 A | 7/1984 | Nanci et al. | |
| 4,627,461 A | 12/1986 | Gordon | |
| 4,790,346 A | 12/1988 | Kolze et al. | |
| 5,131,170 A | 7/1992 | Rilke | |
| 5,181,580 A * | 1/1993 | Burg | 180/116 |
| 6,082,978 A | 7/2000 | Tetour et al. | |
| 6,231,028 B1 * | 5/2001 | Hirata et al. | 251/129.11 |
| 6,443,717 B1 | 9/2002 | Barber | |
| 6,598,851 B1 | 7/2003 | Schiavone et al. | |
| 2005/0104025 A1 * | 5/2005 | Grua | 251/309 |

* cited by examiner

*Primary Examiner*—J. Casimer Jacyna
(74) *Attorney, Agent, or Firm*—Conley Rose, P.C.

(57) ABSTRACT

Methods and apparatus for controlling the flow through a compressor with a valve assembly comprising a rotating body having an outer surface. The rotating body is disposed within a valve cavity in the compressor. A non-contacting seal operates to limit the flow of fluid between the outer surface of the rotating body and the valve cavity. An aperture is disposed through the rotating body. A drive assembly rotates the rotating body such that the aperture intermittently allows fluid to bypass the non-contacting seal as the rotating body is rotated.

28 Claims, 5 Drawing Sheets

ROTATING CHECK VALVE FOR COMPRESSION EQUIPMENT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to methods and apparatus for controlling the flow of gases through compression equipment. More particularly, the present invention relates to methods and apparatus for check valves for compression equipment. Still more particularly, the present invention relates to check valves with rotating closure members.

Reciprocating compressors employ a cyclic process for compressing fluids that involves the suction of low pressure fluid into the compressor, compressing that fluid, and allowing the discharge of pressurized fluid from the compressor. Valves, generally known as check valves, are used to control the suction and discharge of fluids into and out of the compressor.

Many existing suction and discharge valves for the positive displacement compression equipment consist of plates, springs and seats. The operation of this valve is such that the valve plate lifts up from the seat by the gas forces and the spring forces the valve plate to reseat itself. This action causes the valve parts to flex in a fatiguing manner each time the piston cycles. This fatiguing action limits the life of the valve components to a short duration, typically less than a year. As a result, the suction and discharge valves require frequent maintenance, which amounts to very high cost due to product loss and component replacement cost.

In order to extend the useful life of conventional check valves, designers often seek to minimize the flexing of the component parts. In order to minimize the flexing, the valve lifting height is limited, which also limits the area available for the flow of fluids. Because the area available for flow is a limiting factor in the capacity of the pump, reducing this area often leads to designs utilizing multiple valves. Multiple valves not only increase the initial capital cost of the equipment but also increase the cost of maintenance.

The variables used to design conventional valves are numerous and designers historically rely heavily on empirical and experimental data in determining lifting height and opening pressures. Once a conventional check valve system is designed and built, the operation of those valves is limited to the operating parameters originally selected. Therefore, any change the fluid physical properties, thermodynamic properties and operational procedures may negatively affect the performance of the compression equipment and lead to even shorter life for the check valves.

Thus, there remains a need to develop methods and apparatus for controlling flow through compression equipment that overcome some of the foregoing difficulties while providing more advantageous overall results.

SUMMARY OF THE PREFERRED EMBODIMENTS

The embodiments of the present invention are directed toward methods and apparatus for controlling the flow through a compressor with a valve assembly comprising a rotating body having an outer surface. The rotating body is disposed within a valve cavity in the compressor. A non-contacting seal operates to limit the flow of fluid between the outer surface of the rotating body and the valve cavity. An aperture is disposed through the rotating body. A drive assembly rotates the rotating body such that the aperture intermittently allows fluid to bypass the non-contacting seal as the rotating body is rotated.

In certain embodiments a compressor assembly comprises a compressor chamber in fluid communication with a valve cavity, which is in fluid communication with a fluid conduit. A valve body is disposed within said valve cavity. A non-contacting seal limits the flow of fluid between said valve cavity and said valve body. An aperture is disposed through said valve body. A drive assembly rotates said valve body such that said aperture is intermittently in fluid communication with said compressor chamber and said valve cavity.

In some embodiments, the valve body comprises a cylindrical shell having a closed end and an open end in fluid communication with said compressor chamber. The aperture penetrates the cylindrical shell of said valve body. In certain embodiments, the drive assembly comprises a magnet mounted to the closed end of the cylindrical shell and a motor coil affixed to the compressor. A power supply is electrically connected to said motor coil such that an electrical current applied to the motor coil cause the magnet to rotate. The non-contacting seal is disposed axially adjacent to either side of said aperture and comprises a labyrinth sealing surface on the outside surface of said rotating body and a babbitted surface disposed on the valve cavity.

In certain embodiments, the valve body comprises a disk with a shaft extending from an axial face of said disk. An aperture penetrates axially through said disk. The drive assembly comprises a magnet mounted to the shaft and a motor coil affixed to the compressor. The non-contacting seal comprises a labyrinth sealing surface on an outer cylindrical surface of the disk and a babbitted surface disposed on the valve cavity.

In selected embodiments, a method for operating a valve controlling fluid flow through a compressor comprises disposing a valve body within a valve cavity, wherein the valve body comprises one or more apertures therethrough. The flow of fluid between the valve body and the valve cavity is limited by a non-contacting seal. The valve body is rotated so as to intermittently allow fluid to bypass the non-contacting seal through the one or more apertures. The valve body may be rotated by applying an electrical current to a motor coil affixed to the compressor, wherein a magnet affixed to the valve body rotates in response to the electrical current applied to the motor coil.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
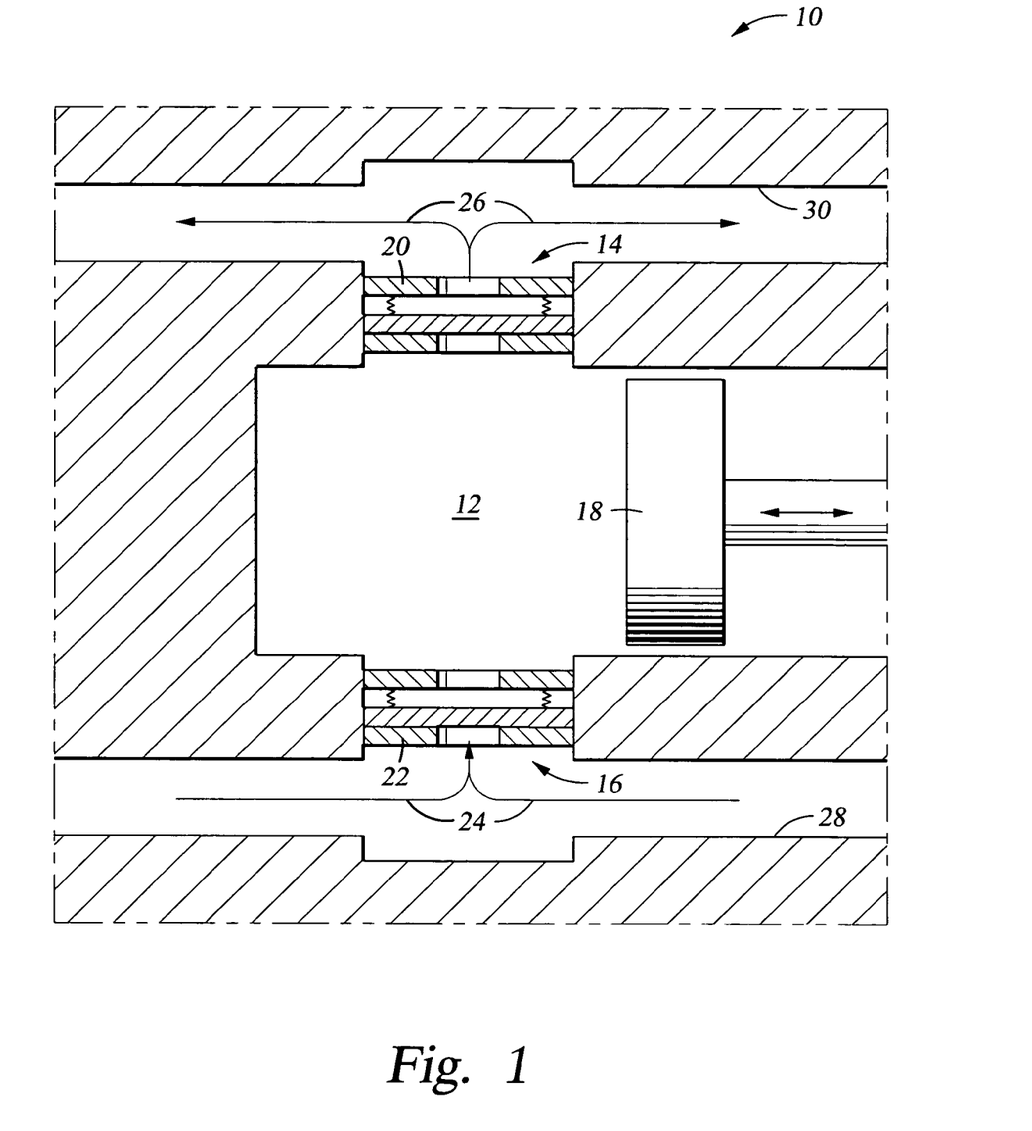
FIG. 1 is a cross-sectional view of a reciprocating, positive displacement compressor utilizing prior art check valves.

Referring now to FIG. 1, a reciprocating compressor assembly 10 includes a compression chamber 12 having suction inlet 16 and discharge outlet 14. Piston 18 moves into and out of compression chamber 12 Suction valve 22 is disposed within inlet 16 and controls the flow from fluid supply 28 into compression chamber 12. Discharge valve 20 is disposed within outlet 14 and controls the flow from compression chamber 12 into fluid outlet 30. As piston 18 moves out of compression chamber 12, the pressure within the chamber decreases and suction valve 22 is opened allowing flow 24 to enter the chamber As piston 18 moves back into compression chamber 12, the pressure within the chamber increases and discharge valve 20 is opened allowing pressurized flow to be expelled from the chamber.

Figure 2:
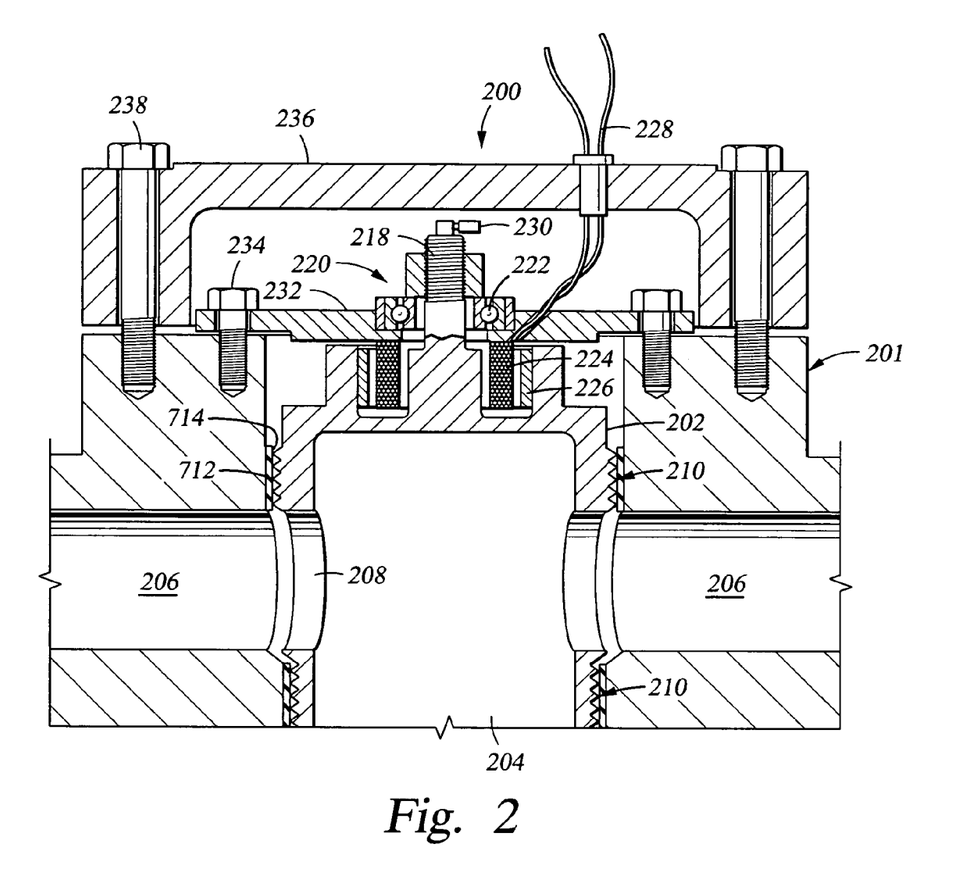
FIG. 2 is a cross-sectional elevation view of a check valve assembly constructed in accordance with embodiments of the invention.
Figure 3:
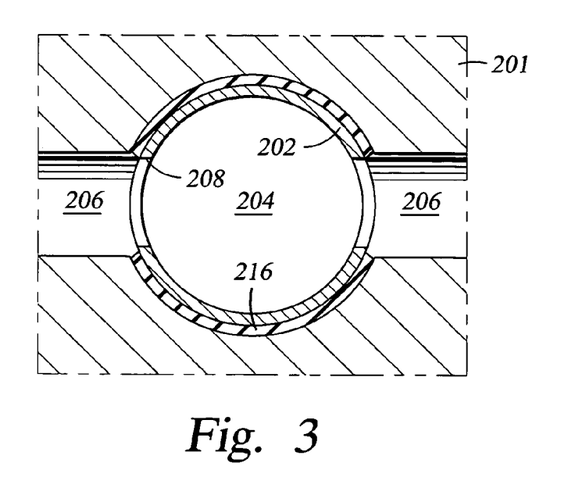
FIG. 3 is a cross-sectional plan view of the check valve assembly of FIG. 2.

Referring now to FIGS. 2 and 3 a rotating valve assembly 200 is shown. Valve assembly 200 is installed within compressor 201 and comprises rotating body 202 and drive system 220. Rotating body 202 is a cylindrical body forming flow chamber 204. Windows 208 provide flow paths for gases to move between flow chamber 204 and compressor gas passages 206. Non-contacting seals 210, comprising labyrinth sealing surface 212 and babbitted surface 214, on either side of windows 208 restrict the flow of gases between rotating body 202 and compressor 201. Low contact force seal 216 also provides a circumferential seal between rotating body 202 and compressor 201 between seals 210 and windows 208. Thus, rotating body 202 is sealed on all sides to ensure that the gas can only flow through windows 208.

Rotating body 202 is rotatably connected to compressor 201 via shaft 218. Rotation is enabled by drive assembly 220 including bearing 222, motor coil 224, magnet 226, and electrical leads 228. Rotating body 202 is supported by bearing 222. Motor coil 224 is fixed to compressor 201 and remains stationary. Magnet 226 is fixed to rotating body 202 and causes the body to rotate in response to a current applied to coil 22 through leads 228. This current can be adjusted to vary the speed of rotating body 202, which is monitored by probe 230 (keyphaser). Plate 232 supports rotating body 202 and drive assembly 220 and is connected to compressor 201 via bolts 234. Valve cap 236 covers plate 232 and provides a passageway for electric leads 228 and probe 230.

Bearing 222 may be a journal thrust bearing or, in certain embodiments could be an antifriction roller type bearing, a single or double antifriction back-to-back ball bearing, or a hydrodynamic bearing, and/or a combination of the above bearings. In alternate embodiments, drive assembly 220 may comprise an induction motor or a DC motor as an alternative to the high speed motor with permanent magnet as shown.

As rotating body 202 rotates, windows 208 are intermittently in fluid communication with gas passages 206. When window 208 is lined up with gas passage 206, gas can pass through window 208 either into or out of flow chamber 204. If being used as a suction valve, gas passes from gas passages 206 into flow chamber 204 as body 202 rotates. If being used as a discharge valve, gas passes from flow chamber 204 into gas passages 206 as body 202 rotates. When windows 208 are not in fluid communication with gas passages 206, compressor 201 is either in the compression cycle or intake position. The speed of rotation of the rotating body 202 can be synchronized to the piston stroke such that windows 208 are in fluid communication with gas passages 206 as the compression cycle needs to discharge or pull in gas.

The compressor control system, or plant main control system, known as DCS, can be utilized to synchronize the alignment of the stationary window with the opening of the rotating body. Synchronization can be achieved by monitoring the piston stroke, which is directly and physically connected to the compressor main driver. As the piston reaches near its top dead center, the stationary and rotating widows will also align themselves. To positively verify this alignment, pressure sensor 239 can be located in the cylinder side of the valve chamber. When the pressure inside the chamber reaches the pressure limit set for the valve chamber, the controller may speed up or slow down the rotating valve body 202 via driver assembly 220 so that the windows line up.

The size of windows 208 and the rotating speed of body 202, including any timing delays, can be selected based on the piston stroke and/or other compression cycles. Rotating body 202 may have one or more windows to allow the gas flow. The size and the shape of windows 208 may be selected based on the quantity, speed and thermodynamic properties of the gas (pressure, temperature, molecular weight, velocity etc). For example, window 208 could be a circular hole of any diameter or could also be a rectangular or any polygonal shape. The material of construction of the valve body could be any type of metal or composite materials which are suitable for the process gas usage.

The compressed gas flow through windows 208 is ensured by the arrangement of seals 210, 216 located between rotating body 202 and compressor 201. Seals 210 are non-contacting seals where a close relationship is maintained between two surfaces but the surfaces do not actually contact. Seals 216 may be low-contact force seals where there is contact between the two surfaces but the contact force is very low. The use of non-contact and low contact force seals provide a system that provides very long seal life and very little friction-created drag on rotating body 202.

One type of seal that may be used is a combination of conventional type labyrinth seals 210 with brush type seals 216. Labyrinth seals 210 comprise a stationary, smooth soft surface (babbitted design) 214 and labyrinth teeth 212 integral with the rotating body 202. This arrangement can also be reversed such that the stationary part would consist of the labyrinth teeth design and the rotating part being the soft and smooth babbitted surface. Brush type seal 216 may be used to ensure gas flows only through the windows 208.

Additionally, other types of seals such as mechanical seals, dry gas seal, oil seal, brush seal, simple bushing seal, honey comb seal and other type of seals are also possible seals that could be utilized to seal and ensure that the gas flows through windows 208. Also the size, quantity of gas flow and configuration of the seal will be selected based on the thermodynamic and velocity of the gas going through the valve body as in conventional seal selection and design criteria. In certain applications, the seals may be located on the inside of rotating body 202 and seal against a cylinder disposed inside the body.

Referring now to FIGS. 4–6B a rotating valve assembly 400 is shown. Valve assembly 400 is installed within compressor 401 and comprises valve assembly 402 and drive system 420. Valve assembly 402 comprises stationary body 409 and rotating body 402, which comprises shaft 403 and ported body 404. Rotating ports 408 and stationary ports 411, when aligned, provide a flow path for gases to move between chamber 413 and gas passages 406. Non-contacting seals 410, comprising labyrinth sealing surface 412 and babbitted surface 414, on the circumference of ported body 404 restricts the flow of gases between rotating body 402 and compressor 401. Low contact force seal 416 provides a seal between rotating body 402 and stationary body 409. Thus, rotating body 402 is sealed on all sides to ensure that the gas can only flow through ports 408, 411.

Figure 4:
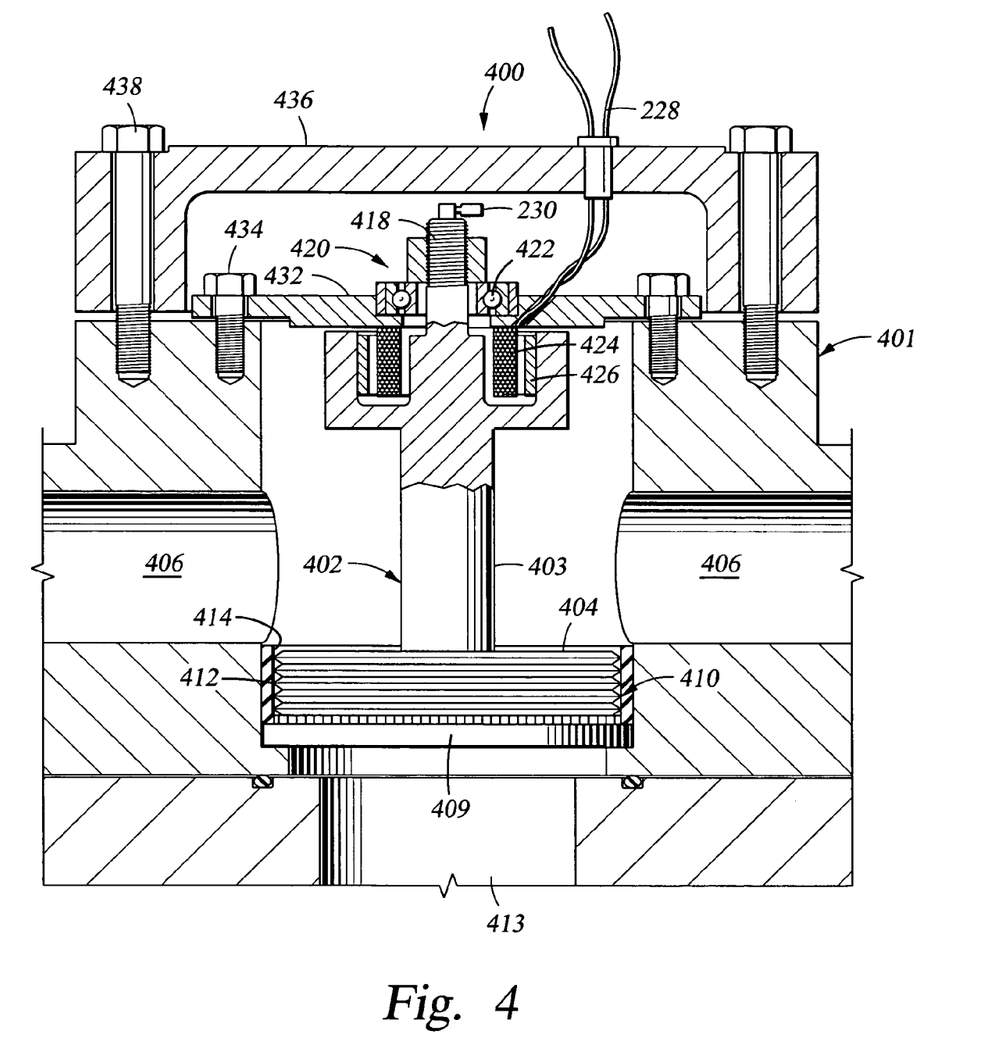
FIG. 4 is a cross-sectional elevation view of a check valve assembly constructed in accordance with embodiments of the invention.
Figure 5A:
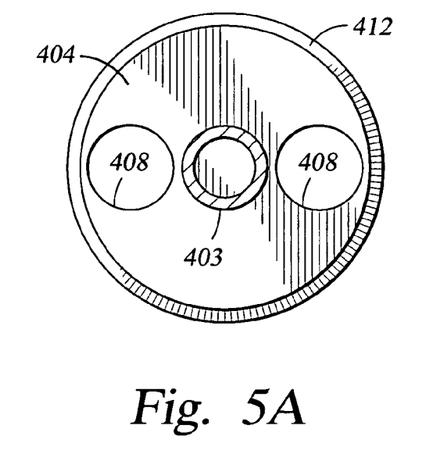
FIGS. 5A and 5B are views the rotating body of the check valve assembly of FIG. 4.
Figure 5B:
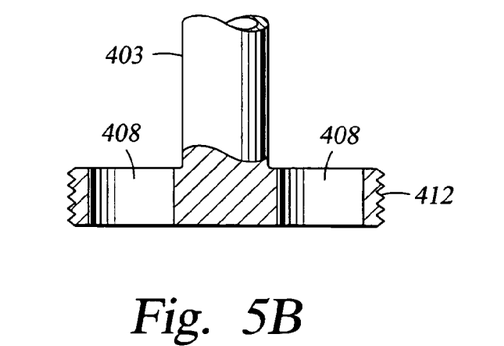
Figure 6A:
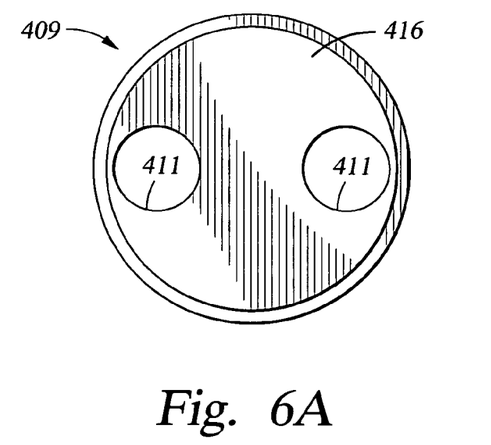
FIGS. 6A and 6B are views of the stationary body of the check valve assembly of FIG. 4.
Figure 6B:
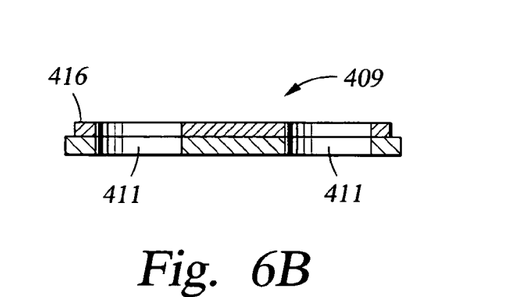

Rotating body 402 is rotatably connected to compressor 401 via shaft 418. Rotation is enabled by drive assembly 420 including bearing 422, motor coil 424, magnet 426, and electrical leads 428. Rotating body 402 is supported by bearing 422. Motor coil 424 is fixed to compressor 401 and remains stationary. Magnet 426 is fixed to rotating body 402 and causes the body to rotate in response to a current applied to coil 422 through leads 428. This current can be adjusted to vary the speed of rotating body 402, which is monitored by probe 430. Plate 432 supports rotating body 402 and drive assembly 420 and is connected to compressor 401 via bolts 434. Valve cap 436 covers plate 432 and provides a passageway for electric leads 428 and probe 430.

Bearing 422 may be a journal thrust bearing or, in certain embodiments could be an antifriction roller type bearing, a single or double antifriction back-to-back ball bearing, or a hydrodynamic bearing, and/or a combination of the above bearings. In alternate embodiments, drive assembly 420 may comprise an induction motor or a DC motor as an alternative to the high speed motor with permanent magnet as shown.

As rotating body 402 rotates, ports 408 and 411 are intermittently aligned to provide fluid communication between chamber 413 and gas passages 406. If being used as a suction valve, gas passes from gas passages 406 into chamber 413 and if being used as a discharge valve, gas passes from chamber 413 into gas passages 406. When ports 408 and 411 are not aligned, compressor 401 is either in the compression cycle or intake cycle. The piston stroke is determined from the crank angle. The speed of rotation of the rotating body 402 can be synchronized to the piston stroke such that ports 408 and 411 are aligned as the compression cycle needs to discharge or pull in gas.

The size and arrangement of ports 408 and 411 and the rotating speed of body 402, including any timing delays, can be selected based on the piston stroke and/or other compression cycles. The size and the shape of ports 408, 411 may be selected based on the quantity, speed and thermodynamic properties of the gas (pressure, temperature, molecular weight, velocity etc). For example, port 408 could be a circular hole of any diameter or could also be a rectangular or any polygonal shape. The material of construction of the valve body could be any type of metal or composite materials which are suitable for the process gas usage.

Figure 7:
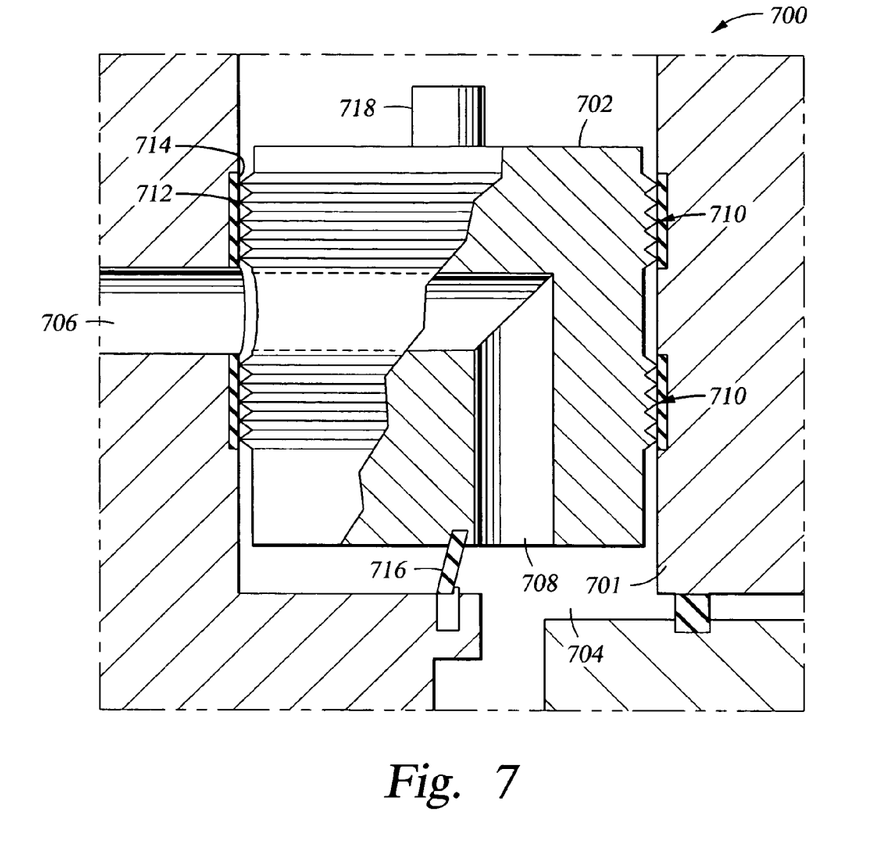
FIG. 7 is a cross-sectional elevation view of a check valve assembly constructed in accordance with embodiments of the invention.
Figure 8:
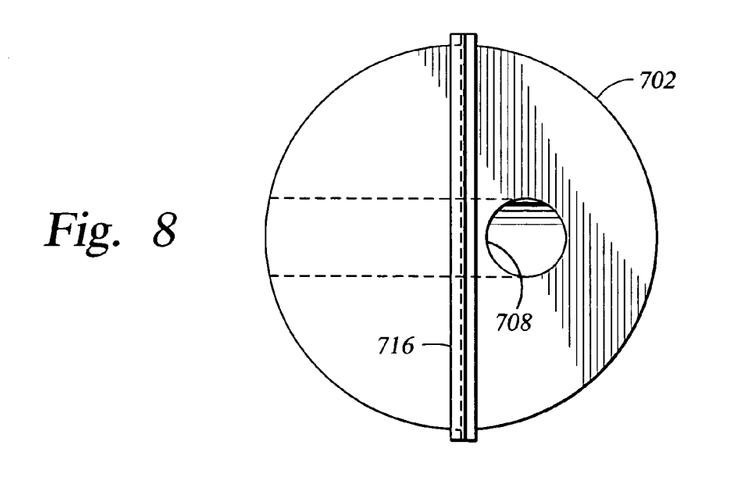
FIG. 8 is a cross-sectional plan view of the check valve assembly of FIG. 7.

Referring now to FIGS. 7 and 8, another rotating valve assembly 700 is shown. Valve assembly 700 is installed within compressor 701 and comprises rotating valve body 702. Rotating body 702 includes flow port 708 and shaft 718. Flow port 708 provides a flow path for gases to move between chamber 704 and gas passage 706. Non-contacting seals 710, comprising labyrinth sealing surface 712 and babbitted surface 714, on the circumference of body 702 restrict the flow of gases between rotating body 702 and compressor 701. Low contact force seal 716 provides a seal between rotating body 702 and compressor 701. Thus, rotating body 702 is sealed on all sides to ensure that the gas can only flow through port 708.

Rotating body 702 is rotatably connected to compressor 701 via shaft 718. Rotation is enabled by the same type of drive assembly which is shown in FIG. 3 as drive assembly 220 and /or in FIG. 4 which is shown as drive assembly 420. As rotating body 702 rotates, port 708 is intermittently aligned with gas passage 706 and chamber 704 in order to provide fluid communication between chamber 704 and gas passage 706. If being used as a suction valve, gas passes from gas passage 706 into chamber 704, while if being used as a discharge valve, gas passes from chamber 704 into gas passage 706. When port 708 is not aligned, compressor 701 is either in the compression cycle or in static position. The speed of rotation of the rotating body 702 can be synchronized to the piston stroke such that port 708 is aligned as the compression cycle needs to discharge or pull in gas.

The size and arrangement of port 708 and the rotating speed of body 702, including any timing delays, can be selected based on the piston stroke and/or other compression cycles. The size and the shape of port 708 may be selected based on the gas flow quantity, speed and thermodynamic properties of the gas (pressure, temperature, molecular weight, velocity etc). For example, port 708 could be a circular passage of any diameter or could also be a rectangular or any polygonal shape.

The material of construction of the valve body could be any type of metal or composite materials which are suitable for the process gas usage. This example of the embodiment most generally will be utilized when the compression gas stream, such as $H^2S$ or others, is very corrosive and ordinarily very difficult and expensive to be handled by conventional valves. This configuration allows the corrosive gas stream to be channeled through the valve body without being in contact with any valve components other than the seals which can be protected by clean and non-corrosive buffer gas.

As described in the above embodiments, the rotating components require no physical contact with the stationary components, including the seal assemblies. Therefore, the wear and tear as experienced by other methodologies including existing conventional system have been eliminated. The rotating valve can also be arranged in any orientation and the sealing surface does not have to be perpendicular to the axis of rotation. Because of the flexibility in arrangement of components and orientation of the axis of rotation, many other configurations of the rotating valve are possible. For example, the axis of rotation may be disposed at any desired angle relative to the sealing surface.

All of the valve components, including the drive system, can be fully contained within the confinement of the valve pocket. Because no rotating components project outside of the valve pocket, no dynamic seals are required and the compression gas is fully contained within the pocket, protecting the environment from any contamination whatsoever. This isolation may also allow a clean buffer gas, compatible with process gas, to be used for the protection of the drive assembly to ensure long life for all the system components.

While preferred embodiments of this invention have been shown and described, modifications thereof can be made by one skilled in the art without departing from the scope or teaching of this invention. The embodiments described herein are exemplary only and are not limiting by size, shape and/or directionality of the rotating body against the stationary body. Many variations and modifications of the system and apparatus are possible and are within the scope of the invention. For example, the relative dimensions of various parts, the materials from which the various parts are made, and other parameters can be varied, so long as the apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A compressor assembly comprising:
   a compression chamber;
   a piston moveable relative to said compression chamber, wherein movement of said piston relative to said compression chamber alternatingly increases and decreases fluid pressure within said compression chamber;
   a valve cavity in fluid communication with said compression chamber;
   a rotating body having an outer surface, wherein said rotating body is disposed within said valve cavity;
   a non-contacting seal operable to limit the flow of fluid between the outer surface of said rotating body and the valve cavity;
   an aperture through said rotating body; and
   a drive assembly operable to rotate said rotating body, wherein said aperture intermittently allows fluid to bypass said non-contacting seal as said rotating body is rotated.

2. The valve assembly of claim 1 wherein said rotating body comprises a cylindrical shell having an open end and a closed end.

3. The valve assembly of claim 2 wherein said aperture penetrates the cylindrical shell of said rotating body.

4. The valve assembly of claim 2 wherein said drive assembly comprises:
   a magnet mounted to the closed end of the cylindrical shell;
   a motor coil affixed to the compressor; and
   a power supply electrically connected to said motor coil.

5. The valve assembly of claim 2 wherein said non-contacting seal is disposed axially adjacent to either side of said aperture.

6. The valve assembly of claim 2 wherein said non-contacting seal comprises a labyrinth sealing surface on the outside surface of said rotating body and a babbitted surface disposed on the valve cavity.

7. The valve assembly of claim 1 wherein said rotating body comprises:
   a disk; and
   a shaft extending from an axial face of said disk.

8. The valve assembly of claim 7 wherein said aperture penetrates axially through said disk.

9. The valve assembly of claim 7 wherein said drive assembly comprises:
   a magnet mounted to the shaft;
   a motor coil affixed to the compressor; and
   a power supply electrically connected to said motor coil.

10. The valve assembly of claim 7 wherein said non-contacting seal comprises a labyrinth sealing surface on an outer cylindrical surface of the disk and a babbitted surface disposed on the valve cavity.

11. A compressor assembly comprising:
    a compression chamber;
    a piston moveable relative to said compression chamber, wherein movement of said piston relative to said compression chamber alternatingly increases and decreases fluid pressure within said compression chamber;
    a valve cavity in fluid communication with said compression chamber;
    a fluid conduit in fluid communication with said valve cavity;
    a valve body disposed within said valve cavity;
    a non-contacting seal operable to limit the flow of fluid between said valve cavity and an outer surface of said valve body;
    an aperture through said valve body; and
    a drive assembly operable to rotate said valve body such that said aperture is intermittently in fluid communication with said compression chamber and said valve cavity.

12. The compressor assembly of claim 10 wherein said valve body comprises a cylindrical shell having a closed end and an open end in fluid communication with said compression chamber.

13. The compressor assembly of claim 12 wherein said aperture penetrates the cylindrical shell of said valve body.

14. The compressor assembly of claim 12 wherein said drive assembly comprises:
    a magnet mounted to the closed end of the cylindrical shell;
    a motor coil affixed to the compressor; and
    a power supply electrically connected to said motor coil.

15. The compressor assembly of claim 12 wherein said non-contacting seal is disposed axially adjacent to either side of said aperture.

16. The compressor assembly of claim 12 wherein said non-contacting seal comprises a labyrinth sealing surface on the outside surface of said valve body and a babbitted surface disposed on said valve cavity.

17. The compressor assembly of claim 10 wherein said valve body comprises:
    a disk; and
    a shaft extending from an axial face of said disk.

18. The compressor assembly of claim 17 wherein said aperture penetrates axially through said disk.

19. The compressor assembly of claim 17 wherein said drive assembly comprises:
    a magnet mounted to the shaft;
    a motor coil affixed to the compressor; and
    a power supply electrically connected to said motor coil.

20. The compressor assembly of claim 17 wherein said non-contacting seal comprises a labyrinth sealing surface on an outer cylindrical surface of the disk and a babbitted surface disposed on the valve cavity.

21. A compressor assembly comprising:
    a compression chamber;

a piston moveable relative to said compression chamber, wherein movement of said piston relative to said compression chamber alternatingly increases and decreases fluid pressure within said compression chamber;

a valve cavity in fluid communication with said compression chamber;

a rotating body disposed within said valve cavity, a drive assembly operable to rotate said rotating body along an axis of rotation;

a seal operable to limit the flow of fluid between an outer surface of said rotating body and the valve cavity.

22. The valve assembly of claim 21 further comprising:

an aperture through said rotating body, wherein said aperture intermittently allows fluid flow through said aperture so as to bypass said seal as said rotating body is rotated, wherein the fluid flowing through said aperture flows in a direction not parallel to the axis of rotation.

23. The valve assembly of claim 22 wherein said rotating body comprises a cylindrical shell having an open end and a closed end.

24. The valve assembly of claim 23 wherein said aperture penetrates the cylindrical shell of said rotating body.

25. The valve assembly of claim 22 wherein said seal is disposed axially adjacent to either side of said aperture.

26. The valve assembly of claim 21 wherein said seal is a non-contacting seal.

27. The valve assembly of claim 21 wherein said seal further comprises a labyrinth sealing surface on the outside surface of said rotating body and a babbitted surface disposed on the valve cavity.

28. The valve assembly of claim 21 wherein said drive assembly comprises:

a magnet mounted to the closed end of the cylindrical shell;

a motor coil affixed to the compressor; and a power supply electrically connected to said motor coil.

* * * * *